United States Patent Office 2,729,691
Patented Jan. 3, 1956

2,729,691

SYNERGISTIC STABILIZING COMPOSITIONS FOR ORGANIC MATERIALS COMPRISING A MIXTURE OF AN ARYLAMINE AND AN ALKYLENEDIAMINE

David O. De Pree, Birmingham, Mich., assignor to Ethyl Corporation, New York, N. Y., a corporation of Delaware No Drawing. Application October 27, 1951,
Serial No. 253,561

7 Claims. (Cl. 260—809)

This invention relates to the stabilization of organic materials normally susceptible to deterioration. More particularly my invention relates to the inhibition of attack by oxygen or ozone and the prolongation of the useful life of oxygen-sensitive materials.

Hydrocarbon fuels for internal combustion engines may be broadly classified into three categories, according to the use for which they are intended; fuels for automotive spark ignition engines, fuels for aircraft spark ignition engines, and fuels for compression ignition engines. Although each such fuel is composed essentially of hydrocarbons, the stability characteristics during the manufacturing process and subsequent storage and use, particularly in the presence of oxygen, differs considerably for each type. For example, typical automotive fuels contain straight and branched chain aliphatics, olefins, naphthenes and some aromatics, while typical aircraft fuels contain smaller proportion of olefins. In recent years fuels for compression ignition engines have contained an increased proportion of cracked stocks, resulting in a higher olefin content and consequent increase in the susceptibility to gum formation. The effect of the deterioration of the fuel upon each type of engine may differ, but equivalent processes of deterioration occur in each fuel. For example, the formation of gum in fuels designed for use in spark ignition engines interferes with normal operation of the ignition system and valves, while the formation of such gummy materials in compression ignition engine fuels interferes with the normal operation of the fuel filters and injectors in such engines.

In general, the hydrocarbons present in automotive gasolines are more susceptible to degradation than those comprising aircraft fuels. However, both automotive and aircraft fuels are commonly blended with tetraethyllead before use. Such blending imposes a further point of instability in the finished fuel, since the tetraethyllead is susceptible to some deterioration by contact with oxygen during the blending, storage and handling operations, with consequent formation of haze, loss of some antiknock value, and lessened performance in the engine. This point of attack is often overlooked and is ordinarily unimportant in automotive fuels, as the protective measures necessary for the base stock are usually more than sufficient to protect the tetraethyllead. If, however, a stabilizing ingredient were added which is capable of protecting only the fuel, the attack upon the tetraethyllead would then become apparent. In aircraft fuels the protection must center upon the antiknock additive, as the fuel itself is relatively stable. Furthermore, this phase of the problem becomes relatively more important in aircraft fuels, since the tetraethyllead content of such fuels is generally several times that present in automotive fuels.

Heretofore, the protection of fuels for internal combustion engines effectively against the two above-described separate but related deleterious effects of contact with oxygen during the refining, manufacturing, blending, storage and handling operations has been accomplished only with difficulty. Furthermore, because of the specifications imposed on such fuels by the rigid requirements of present day engines, particularly aircraft engines, it is essential that any material used to protect such fuels against deterioration be effective in extremely small quantities, on the order of one pound of additive per five thousand gallons of fuel, so that secondary problems do not arise through their use.

Similarly, synthetic and natural elastomers are susceptible to absorption of oxygen with consequent destruction of certain useful physical properties and with the introduction of certain properties which render articles manufactured from such elastomers of limited utility. By absorption of oxygen such elastomers deteriorate prematurely, lose tensile strength and flexibility, and become discolored and embrittled. While certain materials have been proposed for the protection of such elastomers from the deleterious action of oxygen, most of such protective substances, as for example β-naphthol, possess the serious disadvantage, particularly with respect to light colored stocks, that their own degradation products are themselves colored and hence interfere with the color fastness of the stocks being protected.

Further examples of materials which must be protected from the deleterious effects of oxygen include mineral oils, such as lubricating oils, soaps, certain perishable foodstuffs, such as animal and vegetable oils and fats, and synthetic unsaturated organic materials. In general, such organic substances may require protection at any time during the processes of manufacturing, handling, storage and use when they become exposed to and absorb oxygen with deleterious effects.

It is, therefore, an object of my invention to provide means for protecting such organic substances which deteriorate in or are affected adversely by oxygen or ozone. It is a further object of this invention to provide a class of mixtures which provides the required protection against the formation of gummy oxidation and polymerization products of unstable hydrocarbons on contact with oxygen at reduced levels of additive. Another object of my invention is to provide means for increased stabilization of hydrocarbon fuels for internal combustion spark, and compression ignition engines during the manufacturing, handling and storage of such fuels prior to their use without increasing the total amount of stabilizing additive. Likewise, it is an object of this invention to provide means for reducing the antioxidant requirement of unstable organic materials. A still further object of my invention is to provide hydrocarbon fuels containing tetraethyllead which do not deteriorate in contact with oxygen with the resultant formation of gum, haze and tetraethyllead oxidation products. It is also an object of this invention to provide fuels containing tetraethyllead in which there is essentially no loss in performance characteristics due to such deterioration of the tetraethyllead during blending, storage and handling. Likewise it is a particular object of my invention to provide means for preventing embrittlement, discoloration, loss of tensile strength and other harmful effects in elastomers during the milling, compounding, fabrication, storage, handling and use of such elastomer stocks. A further object of the invention is to provide means for protecting other perishable natural or synthetic organic materials from the adverse effects of contact with oxygen. Still further objects will appear from the description of this invention hereinafter.

The above objects can be accomplished by adding to oxygen-sensitive organic materials a small proportion of a composition comprising arylamine antioxidant materials and substances of the class of alkylenediamines.

I have made the discovery that alkylenediamines, themselves incapable of affording effective protection to organic materials against deterioration in the presence of oxygen or ozone, have the property of greatly increasing the effectiveness of previously known antioxidants of the arylamine type. Such alkylenediamines I refer to hereinafter as synergists. The alkylenediamines of this invention are broadly represented by the formula

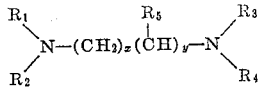

wherein each of $R_1$, $R_2$, $R_3$, $R_4$ and $R_5$ can be the same or different and are selected from hydrogen or alkyl radicals and wherein the subscript $x$ and $y$ are small whole numbers including 0, but not both the $x$ and $y$ can be 0 at the same time. Thus in one embodiment of the synergists of my invention wherein each of the R groups are hydrogen and $y$ is 0, my synergists comprise the diaminoalkanes such as, for example, diaminomethane, ethylenediamine, trimethylenediamine, tetramethylenediamine, pentamethylenediamine and the like. Among my preferred synergists of this type I include those diaminoalkanes wherein $y$ is 0 and the subscript $x$ is up to and including about 8. A further class of diaminoalkanes contemplated as synergists in my antioxidant compositions include those wherein $y$ is 0, but one or more of the nitrogen atoms are substituted with alkyl groups. Typical examples of such embodiments of the synergists of this invention include N-methylethylenediamine, N,N' - diethyl - propylenediamine, N,N - diethyl - pentamethylenediamine, 4 - diethylamino - 1 - dimethylamino - butane, 1 - methylhexylamino - 5 - di - propylamino - pentane and the like. It is further contemplated among the synergists of this invention that a branched chain aliphatic group link the two nitrogen atoms, as for example when $y$ is a small whole number greater than 0 and $R_5$ is alkyl. Among such embodiments of the synergistic amines typical examples include 5 - diethylamino -2 - aminopentane, 1,4 - diamino - 2 - ethyl - butane, 2 - dimethylamino - 3 - diethylamino - heptane, 2,4 - diamino - 3 - methylhexane, 1 - (N - methylamino) - 5 - (N',N' - diethylamino) - 3,3 - di - methylpentane, and the like.

I have found that the replacement of a portion of the arylamine antioxidant of a stabilized composition with an equal weight of my synergistic alkylenediamines, themselves incapable of providing effective oxygen stabilization, results in a stabilized composition which is more resistant to attack by oxygen. Furthermore, to attain a specified degree of oxygen stability the required amount of arylamine-alkylenediamine mixture is less than the required amount of the arylamine antioxidant alone. Typical examples of known arylamine antioxidants which are improved by employing therewith an alkylenediamine synergist include N,N'-di-sec.-butyl-p-phenylenediamine, N-n-butyl-p-aminophenol, N-isobutyl-p-aminophenol, N,N'-di-α-naphthyl-p-phenylenediamine, N,N'-di-isopropyl-p-phenylenediamine, N-phenyl-β-naphthylamine and the like.

The absorption of oxygen by hydrocarbon fuels can be measured directly by the standard method of the American Society of Testing Materials for determination of the Oxidation Stability of Gasoline (Induction Period Method), ASTM Designation: D525–46, as fully described in Part III–A, ASTM Standards for 1946. According to this method the induction period is the period during which there is no absorption of oxygen by the test material as indicated by a drop in pressure, when the test fuel is placed in a testing bomb maintained at a temperature of 100° C. with an initial pressure of 100 pounds per square inch gauge of oxygen. The Induction Period Increase (IPI) is the increase in the duration of this period caused by the addition of a protective substance, and is a direct measure of the protection afforded by such additive. Thus, the longer the IPI the more effective is the stabilizer. To obtain an indication of the low order of effectiveness of my alkylene-diamine synergists when employed alone 6 milligrams of the additive was dissolved in 100 milliliters of the gasoline. Where the solubility characteristics of the material were such that this concentration could not be obtained, a small amount of a solubilizing agent, such as ethyl or isopropyl alcohol, was added in amount up to 2 per cent of the gasoline. Typical of the results so-obtained, 1,4-diaminobutane increased the induction period only 10 minutes, a negligible amount, while 5-diethylamino-2-pentane was without measurable effect on the induction period. Other typical alkylenediamines which do not exhibit an appreciable antioxidant effect when employed alone in gasoline include 4 - diethylamino - 1 - dimethylamino - butane, 1,4 - diamino - 2- ethyl - butane, N - methyl - ethylenediamine, diaminomethane, penta - methylenediamine, and tetramethylenediamine.

The effectiveness of the alkylenediamines as synergists, on the other hand, is shown when they were added to the test gasoline in admixture with known antioxidants. A typical result obtained by employing my synergistic compositions is shown by employing a mixture comprising 33 weight per cent of 1,4-diaminobutane and 67 per cent of N,N' - di-sec. - butyl - p - phenelenediamine in a total concentration of 6 milligrams per 100 milliliters of gasoline and determining the induction period increase of the so-treated gasoline. The induction period increase obtained with the synergistic mixture was 550 minutes. From the known induction period increase of this gasoline containing 4 milligrams of the arylamine antioxidant, 474 minutes, and the negligible contribution of the 1,4-diaminobutane of 4 minutes, it was determined that the synergistic mixture provided a 20 per cent increase in the efficiency of the arylamine antioxidant. Similar results are obtained when other typical synergistic mixtures of my invention are employed, such as, for example, ethylenediamine, N,N' - diethylpropylenediamine, 1 - methylhexylamino - 5 - dipropylamino - pentane, 2,4 - diaminopentane, 2 - dimethylamino - 3 - diethyl - amino - heptane and 4 - diethylamino - 1- dimethylamino - butane, in admixture with the following typical arylamine antioxidants: N,N' - di - isopropyl - p - phenylenediamine, N,N' - di - sec. - butyl - p - phenylenediamine, N - isobutyl - p - aminophenol, N - n - butyl - p - amino - phenol, N,N' - di - α - naphthyl - p - phenylene-diamine, and N - phenyl - β - naphthylamine and the like.

The above induction period determination is only one method of proving the efficiency of an antioxidant material. Another widely used method of establishing the stability of a hydrocarbon fuel comprises storing a sample of the fuel for a period of several months at a temperature of 110° F. and determining from time to time the amount of gum formed in the stored fuel by the so-called "Air Jet Evaporation" method, ASTM Designation D–381-46, fully described in ASTM Standards for 1946, Part III–A. The synergistic antioxidant compositions of my invention when employed in amount between about 0.1 and about 15 milligrams per 100 milliliters of fuel produced extremely effective protection to commercial motor gasolines, both with and without tetraethyl-lead antiknock fluids. Thus the incorporation in such fuels of other additives such as antiknock compounds does not interfere with the operation of my synergistic antioxidant compositions.

A further class of organic substances sensitive to oxygen comprises the elastomers, natural and synthetic. To illustrate the utility of the synergistic mixtures of my invention in protecting such substances I selected a natural rubber compounded into a typical tire-tread formula. One requisite of such stocks is that the desirable properties incorporated therein by careful selection of the compounding ingredients and cure time shall be maintained during extended periods of storage or use in the presence of oxygen. Comparison of various rubber stocks is best carried out on stocks initially having the same state of cure. One of the most reliable means for determining the state of cure is by the T-50 test ASTM Designation: D599-40T, described in the ASTM standards for 1946, Part III-B. This test measures the temperature at which a test piece recovers its elasticity when it is stretched at room temperature, frozen at a sufficiently low temperature to cause it to lose its elastic properties, and then gradually warmed. In practice the temperature noted is that at which the sample recovers to 50 per cent of the original elongation and is, therefore, referred to as the T-50 value. Therefore, in conducting tests, the stocks for testing and comparison were cured for a time sufficient to have a T-50 value of +1° C., so that a valid comparison of the properties could be made. The accelerated aging was conducted by the procedure of ASTM Designation: D572-42, described in the ASTM Standards for 1946, Part III-B, for a period of 96 hours at a temperature of 70° C., with an initial oxygen pressure in the test bomb of 300 pounds per square inch gauge on specimens having the following composition:

| | Parts by weight |
|---|---|
| Smoked sheet | 100.00 |
| EPC carbon black | 45.00 |
| Zinc oxide | 5.00 |
| Stearic acid | 3.00 |
| Pine tar oil | 2.00 |
| Sulfur | 3.00 |
| Mercapto-benzothiazole | 0.65 |
| Stabilizing ingredient | 1.00 |
| | 159.65 |

To demonstrate the protection afforded to the rubber by the mixtures of my invention, the tensile strength and the ultimate elongation of stocks prepared with the addition of a synergistic mixture of this invention were determined before and after aging. These properties were compared with the same properties determined on an identical rubber stock protected by the arylamine antioxidant alone, and finally with a stock not protected by an inhibitor. Both of these properties were determined by means of the test procedure of ASTM Designation: D412-41, fully described in ASTM Standards for 1946, Part III-B. The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therfrom, so that the degree to which these properties are retained is a direct measure of the utility of the protective substance.

A typical improvement in the preservation of the original properties of the above rubber stock is shown by a test wherein the antioxidant mixture of my invention comprised 33 weight per cent of 5-diethylamino-2-amino-pentane and 67 per cent of the commercially accepted rubber antioxidant phenyl-β-naphthylamine, which mixture provided 46.5 per cent retention of the original tensile strength and 77 per cent of the original elongation of the rubber stock. In contrast to this, when phenyl-β-naphthylamine was the only antioxidant present, but in amount equal to the total amount of my synergistic antioxidant mixture, only 40.5 per cent of the original tensile strength and 69 per cent of the original elongation was retained. Thus by replacing 33 per cent of the antioxidant material with the diamine, ineffective when used alone, the efficiency of the arylamine antioxidant was about 170 per cent, with respect to retention of both properties, compared to its use alone. Other typical synergistic alkylenediamines which produce similar improvement in the functioning of arylamine antioxidants include trimethylenediamine, 5-diethylamino-2-amino-pentane, 1-diethylamino-3-amino-2-methyl-pentane, N-methylethylene-diamine, N,N'-diethylpropylenediamine and 1,4-diamino-2-ethyl-butane.

The quantities of the mixtures of my invention incorporated in the materials to be stabilized are not critical and depend largely upon the type of material being stabilized and the conditions under which the exposure to oxygen occurs. For example, with gasolines, tetraethyl-lead, mineral oils and similar materials the synergistic mixtures are preferably employed in concentrations between the limits of approximately 0.1 and 15 milligrams per 100 milliliters of material to be stabilized. For other materials, such as for example elastomers, both natural and synthetic, somewhat larger amounts of the stabilizers of my invention are preferred and can be tolerated. Thus, in such materials I employ between approximately 0.1 and 2 parts of synergistic mixture per 100 parts of oxidizable material. Thus, these mixtures can be satisfactorily employed in a wide range of concentrations, and I do not intend that the invention be restricted to the specific quantities mentioned herein.

Furthermore, I do not mean to be restricted by the ratios of synergistic alkylenediamine to arylamine antioxidant employed in the specific embodiments of my invention disclosed herein by way of examples. Such ratios will be determined in part by the nature of the material to be stabilized, in part by the specific synergistic alkylenediamine. In general, however, I prefer to employ between about 30 and 100 parts by weight of alkylenediamine to 100 parts by weight of arylamine.

I have disclosed a number of preferred embodiments of my invention and illustrated several means whereby protection can be afforded to organic materials sensitive to attack by oxygen. My invention is not intended to be limited to the specific embodiments of the invention herein or to the means described herein for obtaining the advantages possible in employing my synergistic mixtures, as other methods of practicing this invention will be apparent to those skilled in the art.

I claim:

1. A composition comprising a sulfur-vulcanizable rubber normally tending to deteriorate in the presence of oxygen, and in amount between about 0.1 and 2.0 parts per 100 parts of said rubber, a synergistic antioxidant composition consisting essentially of a naphthylamine rubber antioxidant and an alkylenediamine, said alkylenediamine being present in amount between about 30 and 100 parts per 100 parts of said naphthylamine rubber antioxidant.

2. A composition comprising a sulfur-vulcanizable rubber normally tending to deteriorate in the presence of oxygen, and in amount between about 0.1 and 2.0 parts per 100 parts of said rubber, a synergistic antioxidant composition consisting essentially of phenyl-β-naphthylamine and an alkylenediamine, said alkylenediamine being present in amount between about 30 and 100 parts per 100 parts of said phenyl-β-naphthylamine.

3. A composition comprising natural rubber normally tending to deteriorate in the presence of oxygen, and in amount between about 0.1 and 2.0 parts per 100 parts of said rubber, a synergistic antioxidant composition consisting essentially of a naphthylamine rubber antioxidant and an alkylenediamine, said alkylenediamine being present in amount between about 30 and 100 parts per 100 parts of said naphthylamine rubber antioxidant.

4. A composition comprising natural rubber normally tending to deteriorate in the presence of oxygen, and in amount between about 0.1 and 2.0 parts per 100 parts of said rubber, a synergistic antioxidant composition consisting essentially of phenyl-β-naphthylamine and an alkylenediamine, said alkylenediamine being present in amount between about 30 and 100 parts per 100 parts of said phenyl-β-naphthylamine.

5. The composition of claim 1 wherein said naphthylamine rubber antioxidant is phenyl-β-naphthylamine and said alkylenediamine is 5-diethylamino-2-amino-pentane.

6. The composition of claim 3 wherein said alkylenediamine is 5-diethylamino-2-amino-pentane.

7. The composition of claim 4 wherein said alkylenediamine is 5-diethylamino-2-amino-pentane.

References Cited in the file of this patent

UNITED STATES PATENTS

| | | |
|---|---|---|
| 1,725,564 | Calcott et al. | Aug. 20, 1929 |
| 2,166,223 | Semon | July 18, 1939 |
| 2,333,294 | Chenicek | Nov. 2, 1943 |
| 2,447,615 | Jones | Aug. 24, 1948 |
| 2,512,297 | Biswell | June 20, 1950 |